No. 792,518. Patented June 13, 1905.

UNITED STATES PATENT OFFICE.

EMMA HOMANN, OF BERLIN, GERMANY.

REMEDY FOR TREE-CANCER.

SPECIFICATION forming part of Letters Patent No. 792,518, dated June 13, 1905.

Application filed January 13, 1904. Serial No. 188,936.

*To all whom it may concern:*

Be it known that I, EMMA HOMANN, a subject of the German Emperor, and a resident of Kesselstrasse 8, Berlin, Germany, have invented a certain new and useful Improved Preparation for Curing Tree-Cancer, of which the following is a full, clear, and exact description.

The object of this invention is to produce a preparation to effect a lasting cure of trees affected by tree-cancer by completely annihilating the cancer and at the same time protecting the trees from noxious organisms, plants, and animals, particularly hares and rabbits, and this I accomplish with my improved preparation without gouging or chiseling the wound itself, at the same time stopping the spread of the cancer by wind, rain, or animals. A preparation of this nature must prevent the penetration of humidity into the trunk, which would produce rotting and putrefaction; but, on the other hand, the preparation itself must be capable of completely entering into the tree, that the noxious organisms may be destroyed thereby.

To produce this preparation, I mix carbolineum - Avenarius (which is distinguished from ordinary carbolineum by an addition of chlorin) with a solution of a chemical combination of copper—*e. g.*, with a copper-vitriol solution (preferably of one per cent.) and soap, (preferably a grainless soft brown soap.)

By "carbolineum" I intend to embrace the heavy oil products of coal-oil, particularly designed for the preservation of wood.

The quantity of soap used in the mixture is so small as to render the entire mixture soluble, similar to lysol, permitting the gradual penetration of the mixture into the tree to the center of cancer, thus preventing the elimination of it by rain. The mixture does not possess the agglutinative properties of tar or lime.

When coating fruit-trees having cancer-wounds in a very advanced stage, the wounds can be cured in the course of a few months, and the next year the trees will bear fruits as sound trees. A few weeks after treatment the wounds begin to be covered at their circumference with cambium, which will cover wounds of smaller size wholly after some time. Where the wounds of cancer are so great as not to become completely covered with cambium the open wood has become impregnated, and thereby prevented against rotting. Trees thus coated in practice have not since shown any fresh wound of cancer or other cancerous growth, although the ground and the manure has been the same as before. Such a coating is not affected by coldness or heat and does not injuriously influence the trees. Coating whole trunks and branches of trees with this mixture does not prevent the trees from breathing, which makes it not only possible to cure the cancer, but also to protect the trees against that disease. The coating also protects the trees against all noxious animals and plants, particularly hares and rabbits, while the preparation hitherto known did not answer this requirement. The coating of the mixture also annihilates tree-moss and the like, which when growing in abundance greatly impair the breathing of a tree.

The effect of the mixture of the copper-vitriol solution with the carbolineum-Avenarius is increased by the soft soap, which not only has an effect of its own, but produces an intimate intermixing of the two liquors in question.

The mixture is manufactured, preferably, in a manner and proportion as follows: Ninety-seven parts of carbolineum - Avenarius are mixed with two parts of grainless soft brown soap and stirred until dissolved. The solution is mixed with one part of a copper-vitriol solution. A separation of the mixed liquors does not occur even when they have stood for a long period of time. If desired, the copper-vitriol may be employed in connection with substances of alkaline effect, whereby hydroxid of copper is liberated.

The best time for coating whole trunks is winter-time or the time after the fall of the foliage, so that dropping of the leaves is avoided. Cancer-wounds should, however, be coated at once, as the damage done by these is greater than the disadvantage entailed by dropping of the leaves.

I claim as my invention—

1. The herein-described preparation for annihilating tree-cancer and the like, consisting of chlorinated heavy oils of coal-tar mixed with small proportions of soap and of a chemical combination of copper.

2. The herein-described preparation for annihilating cancer and the like, consisting of ninety-seven parts chlorinated carbolineum, two parts of soap and one part of copper-vitriol solution containing one per cent. of copper-vitriol.

In testimony whereof I have signed my name to this specification in the presence of two subscribing witnesses.

EMMA HOMANN.

Witnesses:
JOHANNES HEIN,
HENRY HASPER.